(12) United States Patent
Kaufman

(10) Patent No.: US 9,395,118 B2
(45) Date of Patent: Jul. 19, 2016

(54) BUILDING WITH ENERGY RECOVERY AND STORAGE SYSTEMS

(76) Inventor: Jay Stephen Kaufman, Kingston, NH (US)

( * ) Notice: Subject to any disclaimer, the term of this patent is extended or adjusted under 35 U.S.C. 154(b) by 348 days.

(21) Appl. No.: 13/298,446

(22) Filed: Nov. 17, 2011

(65) Prior Publication Data

US 2012/0056482 A1 Mar. 8, 2012

Related U.S. Application Data

(63) Continuation-in-part of application No. 12/315,002, filed on Nov. 26, 2008, now abandoned, and a continuation-in-part of application No. 11/194,822, filed on Aug. 1, 2005, now abandoned.

(60) Provisional application No. 60/602,949, filed on Aug. 20, 2004.

(51) Int. Cl.
*F25J 1/00* (2006.01)
*F25J 1/02* (2006.01)

(52) U.S. Cl.
CPC .............. *F25J 1/0251* (2013.01); *F25J 1/0012* (2013.01); *F25J 1/0201* (2013.01); *F17C 2270/07* (2013.01); *F25J 2230/22* (2013.01); *F25J 2230/30* (2013.01); *F25J 2240/80* (2013.01); *F25J 2260/30* (2013.01); *F25J 2290/62* (2013.01); *Y02B 10/30* (2013.01); *Y02E 10/725* (2013.01); *Y10T 307/696* (2015.04)

(58) Field of Classification Search
CPC ....... F25J 1/0251; F25J 1/0201; F25J 1/0012; F25J 2260/30; F25J 2230/30; F25J 2240/80; F25J 2290/62; F25J 2230/22; Y10T 307/696; Y02E 10/725; F17C 2270/07; Y02B 10/30
USPC ....... 60/39.5, 39.183; 290/1 R, 1 A, 4 R, 4 A, 290/44, 54, 55
See application file for complete search history.

(56) References Cited

U.S. PATENT DOCUMENTS

| | | | | |
|---|---|---|---|---|
| 3,229,459 | A * | 1/1966 | Cervenka | 60/244 |
| 4,333,018 | A * | 6/1982 | Bottrell | 290/55 |
| 6,097,104 | A * | 8/2000 | Russell | 290/54 |
| 6,765,309 | B2 * | 7/2004 | Tallal et al. | 290/55 |
| 7,398,841 | B2 * | 7/2008 | Kaufman | 180/2.2 |
| 2003/0182944 | A1 * | 10/2003 | Hoffman et al. | 60/772 |
| 2004/0237535 | A1 * | 12/2004 | Ainsworth | 60/772 |
| 2006/0055175 | A1 * | 3/2006 | Grinblat | 290/54 |
| 2010/0219635 | A1 * | 9/2010 | Evans, Jr. | 290/44 |

* cited by examiner

*Primary Examiner* — Hoang Nguyen
(74) *Attorney, Agent, or Firm* — Michael Persson; Catherine Narius; Lawson, Persson & Weldon-Francke, P.C.

(57) ABSTRACT

A building energy recovery system having at least one wind drive mounted to the building structure proximate to the roof junction, a generator and an electrical output. The wind drive includes a radial flow wind turbine having a rotor, a rotatable shaft of the rotor, an open windward facing air intake duct, and a side facing air discharge opening disposed perpendicular to the rotatable shaft of the rotor. The intake duct is in communication with a wind blowing toward the front wall and the discharge opening is in communication with a wake region adjacent to the discharge opening and induced by a wind flowing behind the roof junction.

13 Claims, 1 Drawing Sheet

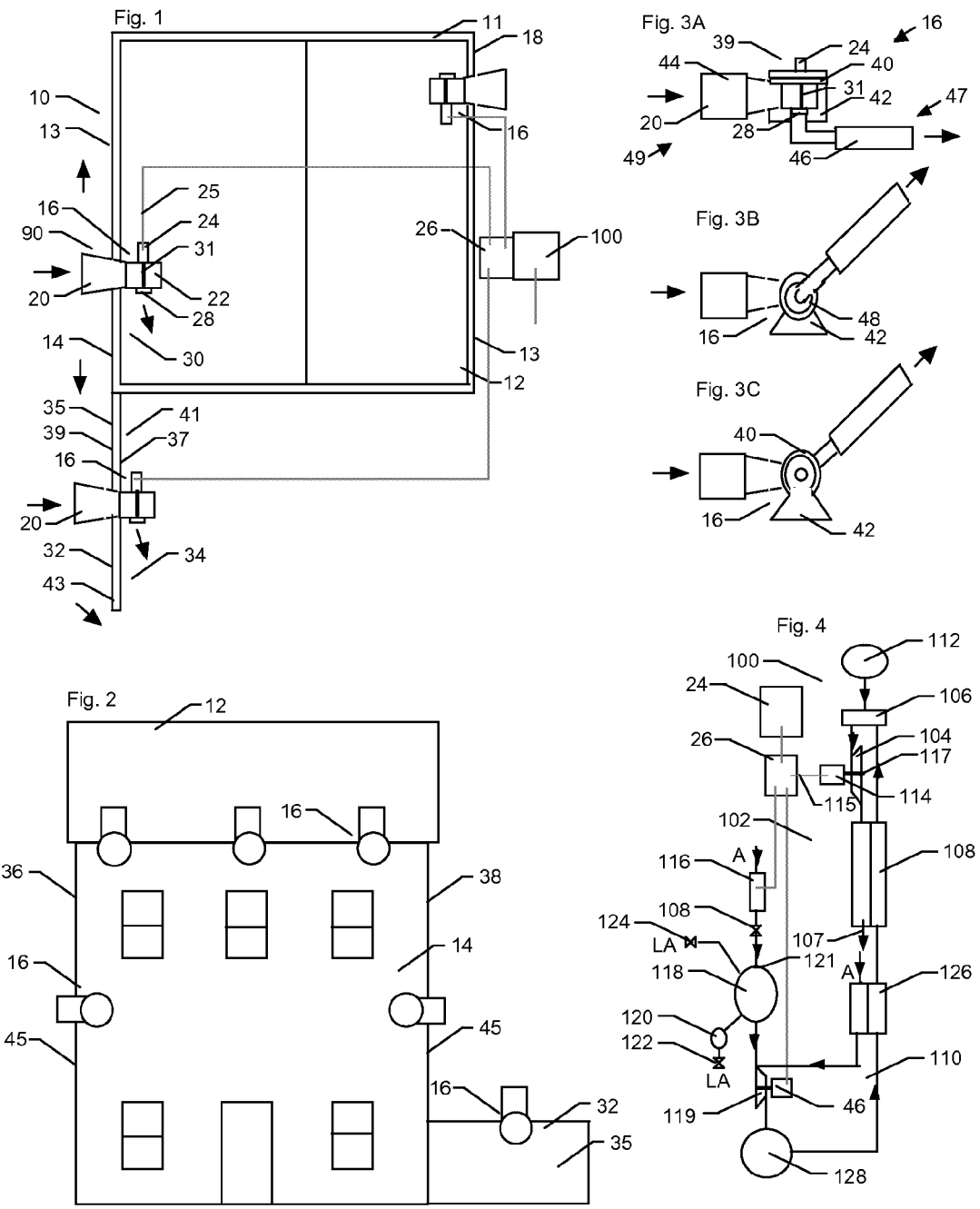

BUILDING WITH ENERGY RECOVERY AND STORAGE SYSTEMS

CLAIM OF PRIORITY

This application is a continuation-in-part application of co-pending U.S. patent application Ser. No. 12/315,002, which is a continuation-in-part of co-pending U.S. patent application Ser. No. 11/194,822, which claims the benefit of priority of Provisional Application Ser. No. 60/602,949, filed Aug. 20, 2004.

FIELD OF INVENTION

The present invention relates to energy recovery and storage systems, and in particular, to a unique energy recovery and storage system for providing wind and other available energy to a building in conjunction with a cryogenic compression cooled gas turbine.

BACKGROUND

Economical on-site generation of power in conjunction with renewable sources has long been a goal of building design to provide energy independence, conserve fossil fuels, and to reduce emission of combustion products. Several concepts are described in the prior art using solar energy, free wind energy or wind dissipated by a structure to provide power to buildings. These systems are inefficient and provide inadequate storage for the intermittent energy recovery. The prior art also describes constant load gas turbine operation with liquid air cooling, but for high fuel consumption grid connected central station use. With the exception of storage and transfer of electrical energy between buildings and vehicles, the prior art does not describe combined and coordinated systems for both instant and reserve use.

As described below, a number of building energy recovery systems have been developed and patented. However, each of these systems has significant disadvantages.

U.S. Pat. No. 6,765,309 issued to Tallal et-al describes a fixed wind turbine with ducted discharge to the rear of a building for recovery of wind impact on roof tops. However, this system is highly inefficient due to its reliance upon extensive ducting, as to duct friction and low suction behind the building create a weak differential pressure. Further, this system requires all power generated to be stored in batteries, which have low capacity per unit mass and recharge relatively slowly.

U.S. Pat. No. 3,956,902, issued to Fields, describes a windmill for supplementing energy to a building. The windmill recovers free wind, which is inefficient due to weak suction. Therefore, this system is insufficient to meet building power requirement. Further, this system also requires all power generated to be stored in batteries.

U.S. Pat. No. 4,229,941, issued to Hope, describes electric generation using combined solar and free wind energy sources. Wind recovery is inefficient due to weak suction. Further, this system also requires all power generated to be stored in batteries.

U.S. Pat. No. 4,455,834, issued to Earle, describes a windmill with a compressed air storage system for providing energy to a building. The windmill recovers free wind, which is inefficient due to weak suction and, consequently, is insufficient to meet building power requirement. In addition, no cooling is provided for the air liquefier.

Other patents have shown the use of liquefied air in connection with power generation. However, these systems also have significant drawbacks. For example, U.S. Pat. No. 4,227,374, issued to Oxley, describes a method for storage of excess energy produced by renewable sources or by a central power station. The energy is used to liquefy atmospheric nitrogen and oxygen, which is stored at cryogenic temperature and used, in combination with a heat source, for powering a heat engine. However, this system does not use the liquefied gases effectively to provide engine compression cooling and supplementary recovered energy and transfer of liquefied gases is not considered.

U.S. Pat. No. 6,920,759, issued to Wakana et-al, describes a liquid air cooled constant load gas turbine for central power station use. Liquid air normally provides engine compression cooling to minimize compression work and the engine drives an air liquefier during off-peak operation to make-up coolant. However, this system also does not use the liquefied gases effectively to provide engine compression cooling and supplementary recovered energy. In addition the transfer of liquefied gases is not considered.

Finally, U.S. Pat. No. 6,097,104 issued to Russell describes a fixed vertical axis wind turbine with discharge between two buildings for recovery of channeled wind impact energy across the turbine. This system does not benefit from high differential pressure due to the combination of directed wind impact and wind induced suction in proximity of the edges of the building. Application is limited to appropriately spaced buildings.

Therefore, there is a need for an energy recovery system for distributed energy application that recovers wind energy dissipated by stationary structures that has adequate suction to provide efficient operation that meet building power requirements, that does not require extensive ducting and its associated losses, creates a liquefied gas from the energy generated thereby, effectively uses the liquefied gases to store recovered wind energy during periods of above average wind speed while providing compression cooling for engine operation during periods of below average wind speed, and allows for the transfer of liquefied gases for similar uses, such as motor vehicle engine compression cooling.

SUMMARY

The present invention is a building that includes at least an energy recovery system and an energy storage system.

In its most basic form, the building includes a building structure with an energy recovery system. The building has at least a front wall and a roof forming a roof junction with the front wall. The energy recovery system includes at least one wind drive mounted to the building structure proximate to the roof junction between the roof and the front wall. The wind drive includes a radial inflow wind turbine comprising an open windward facing air intake duct, a radial inflow rotor, and a side facing air discharge opening disposed in a plane substantially perpendicular to the rotatable shaft of the rotor of the wind turbine. A wind generator is in mechanical communication with the wind turbine and an electrical output is in electrical communication with the wind generator. The intake duct and the discharge of the turbine may be a substantially circular duct or simply openings in the housing of the turbine. Finally, the intake duct is in communication with wind blowing toward the front wall and the discharge opening is in communication with a wake region adjacent to the discharge opening and induced by wind flowing behind the roof junction, for increasing differential pressure between wind impact at the intake duct and wake suction at the discharge opening, across the turbine.

Within the preferred building of the present invention, the preferred wind turbine includes position adjustment means for rotating the wind turbine about its rotatable shaft. These position adjustment means preferably include a rotatable flange. In addition, the preferred wind turbine includes intake duct extension means for lengthening the intake duct and discharge opening extension means for lengthening the discharge opening. The intake duct extension means and discharge opening extension means are preferably slidable tubes. Discharge opening extension means further preferably include a slidable tube that is a rotatable flange in an "L" shape for length and angular adjustment of discharge opening. Intake duct extension means allow the intake duct to be aligned for impact pressure. Discharge opening extension means allow the discharge opening to be positioned for increased suction within the wake zone.

A preferred building also includes a side wall forming a wall junction with the front wall. In these embodiments, at least one wind drive is mounted to the building structure proximate to the roof junction between the roof and the front wall and the wall junction between the front wall and the side wall. In other embodiments, the wind drive is not mounted proximate to the roof junction of the front wall and roof but, rather is mounted along the wall junction between the side wall and front wall. In addition, the intake opening is in communication with wind blowing toward the front wall and the discharge is in communication with a wake region adjacent to the discharge opening and induced by wind flowing behind the wall junction, for increasing differential pressure between wind impact and wake suction across the turbine.

In some embodiments of the building, a second structure, such as a fence, is disposed proximate to the building. The second structure includes at least two surfaces and an edge junction between the at least two surfaces, and the energy recovery system also includes at least one wind drive mounted to the second structure proximate to the edge junction between the two surfaces. This wind drive is similar to and includes the same components as described above. The wind drive is mounted with the intake duct in communication with wind blowing toward the surface and the discharge opening in communication with a wake region adjacent to the discharge opening and induced by wind flowing behind the edge junction, for increasing differential pressure between wind impact and wake suction across the turbine.

The energy storage system of the present invention is also a preferred feature of the building of the present invention. This system includes a gas turbine sub-system and an air liquefier sub-system. The gas turbine includes a compressor in fluid communication with at least one source of air, a combustor in fluid communication with the at least one compressor, a source of fuel in fluid communication with the combustor, a turbine in fluid communication with the combustor and in mechanical communication with a rotatable shaft, and reserve generator in mechanical communication with, and driven by, the rotatable shaft. The reserve generator includes an electrical output, which preferably supplies power to a power conditioner in electrical communication with the electrical output of the energy recovery system and the electrical output of the reserve generator. The power conditioner provides power to the compressor of the gas turbine and to a liquid air supply, and exports power for use by the building or for sale to the power grid.

The preferred energy storage system includes an air liquefier in electrical communication with the power conditioner and in fluid communication with atmospheric air, a liquid air storage tank in gravity fed fluid communication with the liquefier and the compressor, and a compressed air storage tank disposed between and in fluid communication with the compressor and the combustor. The gas turbine also includes a recuperator with an exhaust and the preferred energy storage system also includes a chiller in fluid communication with the compressed air storage tank, the liquid air storage tank, the atmospheric air, and the exhaust of the recuperator. In this embodiment, the chiller is disposed between the compressed air storage tank and the recuperator, and the recuperator is disposed between the chiller and the combustor.

Finally, the preferred energy storage system also includes a liquid air inlet, a liquid air pump, and a liquid air drain valve in fluid communication with the liquid air storage tank. The liquid air inlet allows liquid air to be added to the liquid air supply from an external source. The liquid air pump and a liquid air drain valve allow liquid air produced by the liquid air supply to be exported to another use, such as to operate a liquid air driven vehicle.

Therefore, it is an aspect of the present invention, therefore to provide an energy recovery system for distributed energy application having provision for recovery of wind energy dissipated by stationary structures, and transfer of liquefied gas between stationary structures and vehicles.

It is another aspect of the present invention to provide a system for combining recovered energy sources available to stationary structures.

It is another aspect of the present invention to provide a storage system to make up the difference between energy requirements of a building and available recovered energy.

In keeping with these aspects and others which may become apparent, the present invention seeks to provide a unified energy system to recover, store, transfer and utilize energy dissipated by a stationary structure or otherwise available thereto.

(a) A feature of the energy system in accordance with the present invention lies in combining wind and other recoverable energy sources of a building and proximate stationary structures, for delivering electrical energy.

(b) Another feature of the energy system in accordance with the present invention lies in providing a reserve gas turbine engine to make up the difference between energy requirements of a building and available recovered energy.

(c) Another feature of the energy system in accordance with the present invention lies in providing an energy recovery system for a building having wind turbine-generators, driven by the difference between impact and wake pressures while discharging to high suction locations behind windward edges of the building or proximate structures, for delivering electrical energy.

(d) Another feature of the energy system in accordance with the present invention lies in providing position adjustment of intake and discharge openings to increase differential pressure across the radial inflow turbine.

(e) Another feature of the energy system in accordance with the present invention lies in providing liquid air for compression and pre-compression cooling of a reserve gas turbine engine to reduce engine compression work.

(f) Another feature of the energy system in accordance with the present invention lies in providing an air liquefier, driven by recovered energy or a reserve engine, for liquefaction of atmospheric air.

(g) Another feature of the energy system in accordance with the present invention lies in providing capability for storage and transfer of liquefied air between buildings and vehicles.

These aspects and features of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIG. 1 is a schematic illustration showing connection of components of a wind energy recovery system and storage system for providing power to a building.

FIG. 2 is a front view of the building and fence structures of FIG. 1.

FIG. 3A is a top view of one embodiment of the adjustable intake and discharge ducts attached to the radial inflow turbine of the present invention.

FIG. 3B is a side view of one embodiment of the adjustable intake and discharge ducts of attached to the radial inflow turbine of the present invention.

FIG. 3C is a side view of another embodiment of the adjustable intake and discharge ducts of attached to the radial inflow turbine of the present invention.

FIG. 4 is a schematic illustration showing connection of components of the preferred reserve engine-generator portion of the energy storage system that form part of the building energy recovery and storage system of the present invention in which solid line joining components indicate fluid flow, arrows indicate flow direction, and dashed lines indicate electrical connection.

DETAILED DESCRIPTION

FIG. 1 illustrates one embodiment of the energy recovery system 90 and energy storage system 100 of the present invention installed in a building 10 with a roof 12, a windward front wall 14 with an attached wind drive 16 and a rear wall 18 (not shown) with a similar attached wind drive 16. Front wall 14 and roof 12 form roof junctions 13. Wind energy captured by an intake duct 20 of a wind turbine 22 of drive 16 provides power from a wind generator 24 to the building 10 through a power conditioner 26 while wind discharges through a discharge opening 28 to a wake region 30 of the roof 12.

Wind energy capture works on the principle of parallel flow under equal pressure difference, with main flow over the building 10 producing a smaller bypass flow through the wind turbine 22 and discharge opening 28. As shown in FIG. 1, discharge opening 28 is a circular duct that is disposed in a plane in substantially perpendicular relation with the rotatable shaft 31 of the rotor of wind turbine 22 in the wake region 30 of the roof 12. However, as described below, the discharge opening 28 may take any form as long as it is disposed in generally perpendicular relation with the rotatable shaft 31 of the rotor of wind turbine 22 in any wake region of the building 10. Although the rotor of wind turbine 22 is not shown, it is understood to be any radial inflow rotor common in the art and housed within wind turbine 22. By disposing the discharge opening 28 in this manner, the lower pressure in the wake region 30 creates suction within the discharge opening 28, which augments the flow through the wind turbine 22.

FIG. 1 also shows second structure 41 with first and second surfaces 35, 37 and edge junction 39 between them. In the embodiment shown, second structure 41 is fence 32. In addition to the wind drives 16 mounted to building 10, additional wind drives 16 are mounted to fence 32 with discharge opening 28 disposed in a fence wake region 34 just behind the top edge 43 of fence 32 thereof. These wind drives 16 are similar in all respects to the wind drives 16 mounted at roof junction 13 of the roof 12 and front and rear walls 14, 18 of the building 10 except that their discharge openings 28 are mounted close to the fence 32 due to the closer proximity of fence wake region 34 to the fence 32. It is noted that the mounting of wind drives 16 to a fence 32 is for illustrative purposes and is meant to show that the wind drives 16 may be mounted to a variety of second structures 41, provided they have edge junctions 39 between surfaces 35, 37 that result in a wake region 34 of reduced pressure. It is noted that all wind drives 16 produce direct current electrical power, which is preferably used to power the energy storage system 100 of the present invention, discussed in more detail with reference to in FIG. 4. Wind generator 24 is preferably a coil and magnet type generator that converts the rotational mechanical energy from the wind turbine 22 into electricity, which is in electrical communication with electrical output 25 indicated with a dashed line.

FIG. 2 illustrates a preferred embodiment of energy recovery system 90 of the present invention. The building 10 includes a sloped roof 12, front wall 14, rear wall 18 (shown in FIG. 1), and side walls 36, 38. Side walls 36, 38 form wall junctions 45 with front wall 14. A plurality of wind drives 16, such as those described with reference to FIG. 1, are disposed along the roof junction 13 between the roof 12, front wall 14, and rear wall 18. The number and location of these wind drives 16 in FIGS. 1 and 2 are for illustrative purpose only and, in locations where wind blows primarily in a generally single direction, such as along the seacoast of New Hampshire, the wind drives 16 may only be disposed upon a single wall 14, 18, 36, or 38.

In addition to the wind drives 16 at the roof junction 13 of the roof 12 and front and rear walls 14, 18, wind drives 16 are also mounted along the junction 45 between front wall 14 and side walls 36, 38. These wind drives 16 are similar to those of FIG. 1 except that the discharge opening 28 of each is disposed proximate to the junction between front wall 14 and side walls 36, 38. Like the wind drives 16, the discharge openings 28 of the side wall wind drives 16 are disposed proximate to wake regions alongside walls 36, 38.

FIGS. 3A-3C illustrate position adjustment means 39 for rotating wind turbine 22 about rotatable shaft 31; intake duct extension means 49 for lengthening intake duct 20; and discharge opening extension means 47 for lengthening discharge opening 28. FIG. 3A is a top view illustrating a wind drive 16 with preferred position adjustment means 39, including rotatable flange 40 for angular adjustment of drive 16 in relation to a support base 42; preferred intake duct extension means 49, including slidable tube 44 for length adjustment of intake duct 20; and preferred discharge opening extension means 47, including slidable tube 46 and rotatable flange 48 for length and angular adjustment of discharge opening 28, respectively. FIGS. 3B and 3C illustrate side views of rotatable flanges 48 and 40, respectively.

FIG. 4 illustrates a preferred embodiment of storage system 100. It is understood that all features of storage system 100 shown in FIG. 4 are encompassed in the box labeled "100" in FIG. 1. A reserve engine 102 with a gas turbine 104, a combustor 106, and a recuperator 108 with exhaust 107 receives air from a chilled air supply 110 and fuel from a fuel tank 112 to drive a reserve generator 114 for providing power to power conditioner 26, as shown in FIG. 1. Electrical power from the wind drive(s) 16 and wind generator 24 is supplied to power conditioner 26, which delivers stable power output. In some embodiments, power conditioner 26 includes a rheostat and an inverter, which converts the direct current electrical power into alternating current. The power conditioner 26 provides power to air liquefier 116, which takes in atmospheric air A, liquefies atmospheric air A, and supplies liquid air to a liquid air storage tank 118. Liquid air storage tank 118 is preferably a dewar, or other cryogenic tank, that maintains the air in a liquid state. It is preferred that the liquid air storage tank 118 include a liquid air inlet 121, a liquid air pump 120, and a drain valve 122 that allows liquid air LA to be drained from the liquid air storage tank 118 for use in other applications, such as vehicle operation, in which liquid air LA may be used. It is also preferred that the liquid air storage tank 118 include a fill valve 124 that allows liquid air LA to be added to the liquid air supply from an external source (not shown).

Liquid air preferably flows from the liquid air storage tank 118 into compressor 119, where it is mixed with atmospheric air A from a chiller 126 to form vaporized liquid air. Compressor 119 is powered by electricity from power conditioner 26. Compressor 119 acts to heat and compress the air and liquid air mixture such that the liquid air changes phase and turns into compressed air. This compressed air then flows into a compressed air tank 128. Compressed air from the compressed air tank 128 flows through the chiller 126, which is a counter-flow heat exchanger that allows heat from the atmospheric air to be transferred to the compressed air. The compressed air then flows through the recuperator 108, which is also a counter-flow heat exchanger that allows heat from the exhaust gasses from the gas turbine 104 to be transferred to the compressed air. The heated compressed air then passes into combustor 106, where fuel from the fuel tank 112 is fired. Combustion gasses then pass from the combustor 106 into the gas turbine 104, which includes rotatable shaft 117, causing gas turbine 104 to rotate and drive the reserve generator 114, which converts the rotational energy into electrical energy that is fed back to the power conditioner 26 through electrical output 115, indicated by a dashed line.

Example performance for the preferred system is presented for a two-story building with 223 m² (2400 ft²) plan area and 66 m² (720 ft²) front area. Average energy demand of the building is 30 kWhr (40 hphr) per day. The wind generator drives the air liquefier during periods of over average wind speed. Wind conditions are assumed to be mean wind speed of 9.7 km/hr (6 mph) and peak wind speed of 19.3 km/hr (12 mph). As explained above, wind recovery works by airflow over windward building edges, suctioning a smaller flow through a series of appropriately spaced and positioned radial inflow wind turbines. Estimated wind turbine conditions are; optimum on-center spacing of four turbine rotor diameters, suction of four wind impact velocity heads and turbine impact velocity of 1.2 times mean wind speed. Reserve engine efficiency with compression cooling is 80% while maintaining relatively constant load and both wind and reserve generator efficiency is assumed to be 90%. Under these conditions average wind generation meets 100% of building electrical demand for one day and above average wind generation for one day drives the air liquefier to produce liquid air required for-six days of engine compression cooling with zero wind speed.

Engine operation is in a Brayton cycle modified by addition of liquid air injection. In the example case, gas turbine inlet temperature is 1160 K (2100 OR) and pressure ratio is 0.5 mPa (5 atm), which is compatible with commercially available micro-turbine engines in the appropriate size range. The gas turbine also enables a wide selection of fuels. Atmospheric intake air is cooled at nearly constant pressure to the compressor inlet, first in the chiller and then by mixing with liquid air from the liquid air tank within the compressor. The pressurized mixture continues above ambient temperature, absorbing exhaust heat in the pressurized side of the recuperator and heat of combustion in the combustor, followed by expansion in the gas turbine and cooling of exhaust in the low pressure side of the recuperator. During one day of operation gasoline equivalent fuel consumption is 17.6 kg (8 lb) based on a lower heating value of 42000 kJ/kg (18000 Btu/lb) and liquid air consumption is 82 kg (180 lb). The working fluid cools gas turbine exhaust to ambient in the recuperator because compression heating is at less than ambient temperature. Liquefier performance is based on a figure of merit of 0.5, defined as ideal reversible work input of 714 kj/kg (307 btu/lb) of liquid yield divided by estimated real work input of 1428 kj/kg (614 btu/lb) of liquid yield.

The reserve engine with compression cooling provides approximately twice the efficiency of a conventional gas turbine, proportionately lower emissions and efficiency is relatively constant over the load range. Reduced fuel use helps to enable local production of bio-fuel. The liquid air energy storage system provides approximately eight times the reserve capacity as with lead acid batteries.

Although the description above contains many specifics, these should not be construed as limiting the scope of the invention, but only to provide illustrations of some of the preferred embodiments of this invention. For example, the energy recovery and energy storage systems of the present invention can use any suitable fuel, available heat source or working fluid. Wind and liquefied gas can be used in any combination to enable mechanical or electrical drive of working fluid compressors and gas liquefiers. Features such as quasi-isothermal expansion or reheating, or quasi-isothermal compression or inter-cooling of the working fluid can enhance engine performance. Engine emissions can be improved by features such as separation of carbon dioxide from combustion products and support of combustion by oxygen enriched air. Finally, wind recovery can be enhanced in various ways including building orientation to the wind and arrangement of adjacent structures. Accordingly, the scope of the invention should be determined by the appended claims and their legal equivalents, rather than the examples given.

What is claimed is:

1. A building comprising:
    a building structure comprising at least a front wall and an angled roof forming a roof junction with said front wall; and
    an energy recovery system comprising:
        at least one wind drive mounted to said building structure proximate to said roof junction between said roof and said front wall, said at least one wind drive comprising a radial inflow wind turbine comprising:
            a radial inflow rotor;
            a rotatable shaft of said rotor;
            an open windward facing air intake duct; and
            a side facing air discharge opening disposed in a plane substantially perpendicular to said rotatable shaft of said rotor;
        a wind generator in mechanical communication with said wind turbine of said at least one wind drive; and
        an electrical output in electrical communication with said wind generator;
    wherein said intake duct is in communication with a wind blowing toward said front wall and said discharge opening is in communication with a wake region adjacent to said discharge opening and induced by a wind flowing behind said roof junction.

2. The building as claimed in claim 1, wherein said wind turbine of said at least one wind drive of said energy recovery system further comprises position adjustment means for rotating said wind turbine about said rotatable shaft of said rotor of said wind turbine.

3. The building as claimed in claim 2, wherein said wind turbine of said at least one wind drive of said energy recovery system further comprises intake duct extension means for lengthening said intake duct and discharge opening extension means for lengthening said discharge opening.

4. The building as claimed in claim 3, wherein said intake duct extension means and said discharge extension means comprise slidable tubes.

5. The building as claimed in claim 1, further comprising at least one side wall forming a wall junction with said front wall, wherein at least one of said at least one wind drive is mounted to said building structure proximate to said roof junction between said roof and said front wall and said wall junction between said front wall and said at least one side wall.

6. The building as claimed in claim 1, further comprising at least one side wall forming a wall junction, wherein said at least one of said at least one wind drive is mounted to said building structure proximate to said wall junction between said at least one side wall and said front wall.

7. The building as claimed in claim 1, further comprising a second structure proximate to said building;
wherein said second structure comprises at least two surfaces and an edge junction between said at least two surfaces;
wherein said energy recovery system further comprises at least a second wind drive mounted to said second structure proximate to said edge junction, said at least one second wind drive comprising a second radial inflow wind turbine comprising:
a second radial inflow rotor;
a second rotatable shaft of said second rotor;
a second open windward facing air intake duct; and
a second side facing air discharge opening disposed in a plane substantially perpendicular to said second rotatable shaft of said second rotor;
wherein said second intake duct is in communication with a wind blowing toward one of said at least two surfaces and said discharge opening is in communication with a wake region adjacent to said discharge opening and induced by a wind flowing behind said edge junction.

8. The building as claimed in claim 7, wherein said second structure is a fence.

9. The building as claimed in claim 1, further comprising an energy storage system comprising:
at least one compressor in fluid communication with at least one source of air;
a combustor in fluid communication with said at least one compressor;
a source of fuel in fluid communication with said combustor;
a turbine in fluid communication with said combustor and in mechanical communication with a rotatable shaft; and
a reserve generator in mechanical communication with, and driven by, said rotatable shaft, wherein said turbine generator comprises an electrical output.

10. The building as claimed in claim 9, wherein said energy storage system further comprises a power conditioner in electrical communication with said electrical output of said energy recovery system and with said electrical output of said reserve generator of said energy storage system.

11. The building as claimed in claim 10, wherein said energy storage system further comprises:
an air liquefier in electrical communication with said power conditioner and in fluid communication with a source of atmospheric air;
a liquid air storage tank in gravity fed fluid communication with said air liquefier and said at least one compressor; and
a compressed air storage tank disposed between and in fluid communication with said at least one compressor and said combustor.

12. The building as claimed in claim 11, wherein said turbine of said energy storage system further comprises a recuperator with an exhaust and wherein said energy storage system further comprises:
a chiller in fluid communication with said compressed air storage tank, said liquid air storage tank, said source of atmospheric air, and said recuperator;
wherein said chiller is disposed between said compressed air storage tank and said recuperator and wherein said recuperator is disposed between said chiller and said combustor.

13. The building as claimed in claim 11, wherein said energy storage system further comprises a liquid air inlet, a liquid air pump, and a liquid air drain valve in fluid communication with said liquid air storage tank.

* * * * *